Jan. 30, 1923.
E. W. COURTRIGHT.
AUTOMOBILE SIGNAL.
FILED APR. 28, 1922.
1,443,894.
3 SHEETS—SHEET 1.
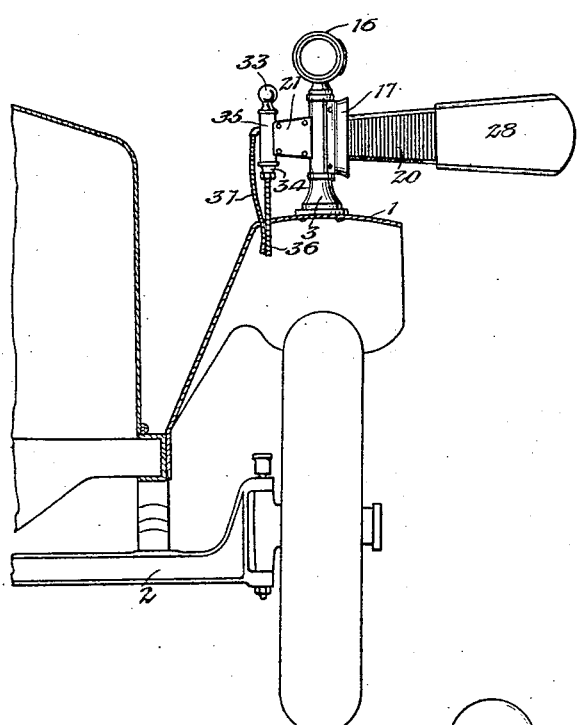
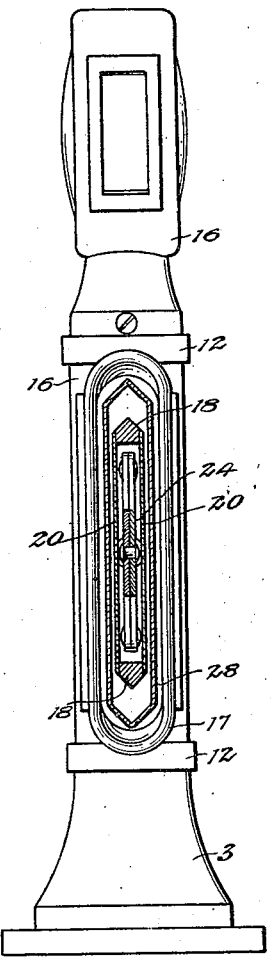
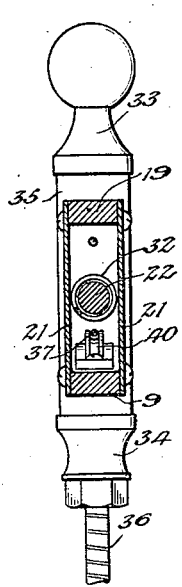
WITNESSES
Frederick Diehl.
Franklin J. Foster
INVENTOR
E. W. Courtright
BY
ATTORNEYS

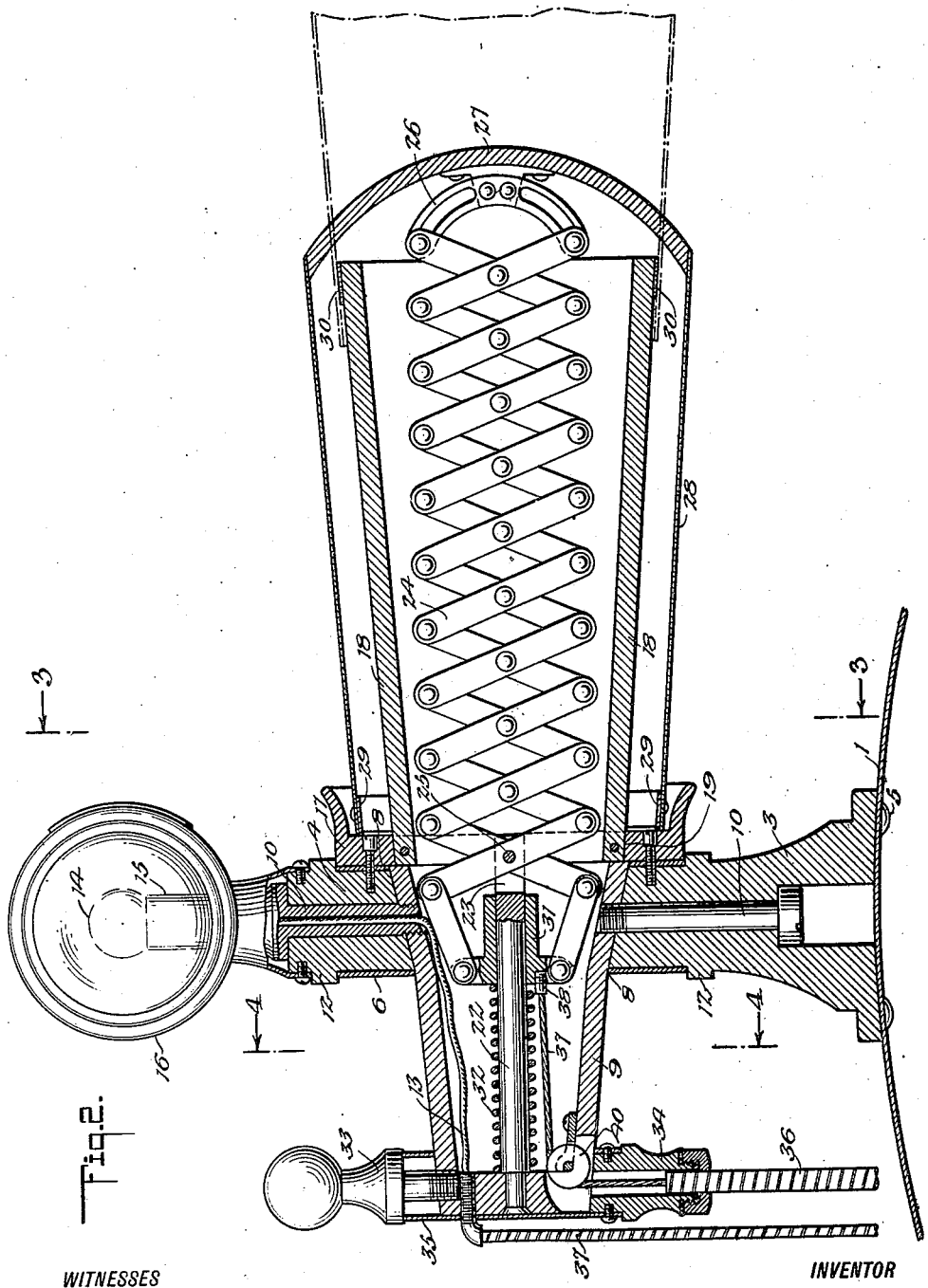

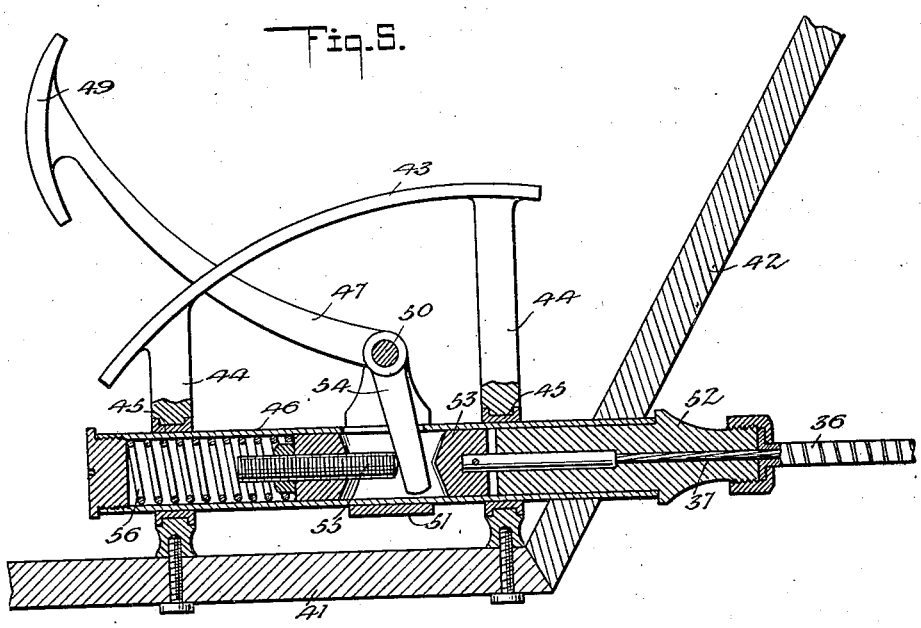
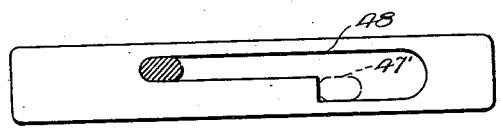

Patented Jan. 30, 1923.

1,443,894

UNITED STATES PATENT OFFICE.

ERNEST W. COURTRIGHT, OF NEW YORK, N. Y.

AUTOMOBILE SIGNAL.

Application filed April 28, 1922. Serial No. 557,152.

*To all whom it may concern:*

Be it known that I, ERNEST W. COURT-RIGHT, a citizen of the United States, and a resident of the city of New York, borough of Manhattan, in the county and State of New York, have invented a new and Improved Automobile Signal, of which the following is a full, clear, and exact description.

This invention relates to improvements in automobile signals, an object of the invention being to provide a signal in the form of a semaphore which may be mounted upon the forward mud guard, or in any other conspicuous place about a car to warn the drivers of approaching cars or following cars of the proposed movement of the car carrying the signal.

A further object is to provide a semaphore of this character, and to provide a novel form of pedal controlled operating means therefor.

Still another object is to provide a signal which will be simple and practical in construction, neat and attractive in appearance, strong durable and efficient in use, and capable of being manufactured with comparative economy.

With these and other objects in view, the invention consists in certain novel features of construction and combinations and arrangements of parts as will be more fully hereinafter described and pointed out in the claims.

In the accompanying drawings:—

Figure 1 is a sectional view through an automobile showing my improved signal in applied and signaling position;

Figure 2 is a longitudinal sectional view through the signal;

Figure 3 is a transverse sectional view therethrough on the line 3—3 of Figure 2;

Figure 4 is a similar view on the line 4—4 of Figure 2;

Figure 5 is a sectional view of my improved pedal controlled operating mechanism; and Figure 6 is a plan view of the sector bar.

Referring in detail to the drawings I have used the reference numeral 1 to designate one of the forward fenders of an automobile 2. My improved signal is preferably mounted upon the fender.

Referring now to the construction of the signal itself, the numerals 3 and 4 designate respectively the lower and upper castings or sections of a post. The lower section is secured, as indicated at 5, to the lower guard 1. A sleeve 6 encircles and connects the post sections and openings 8 in the sleeve are provided for the reception of a substantially U shaped casting 9, the arms of which extend through the openings of the sleeve and are rigidly connected to the post sections 3 and 4 by screws 10 and 11 respectively. These screws passing through the post sections rigidly couple the post sections to the casting 9 prevent relative separation of the sections and hold the sleeves 6 in place between flanges 12 on the post sections. That screw 10 which is tapped through the upper post section into the upper arm of the casting 9 is hollowed to receive an electric wire 13, supplying power to a lamp 14 mounted in a socket 15 upon the top of the post section 4. Any suitable globe 16 is supported upon the upper end of the post section 4 to enclose and protect the lamp.

In a position diametrically opposed to the direction in which the casting 9 extends an oval cup-shaped bumper 17 is secured upon the outer face of the sleeve 6. A pair of radially extending arms 18 are secured to the walls of an opening 19 in the bumper which registers with one of the openings 8 in the sleeve and side plates 20 carried by the arms 18 cooperate with the arms to provide the inner stationary end of my improved extensible semaphore. Side plates 21 secured to the U shaped casting 9 serve to conceal a guide rod 22 fixed to the intermediate portion of the casting and terminating in a bifurcated outer end 23.

A pair of lazy tongs 24 are pivoted upon a pin 25 in the bifurcated end of the rod 22 and the outer end of the tongs is connected to a plate 26 secured to the outer end 27 of a hollow arm 28. The arm 28 surrounds and normally conceals the stationary end of the semaphore hereinbefore described, and extension of the tongs serves to project this arm outwardly, as indicated most clearly in Figure 1, the outward movement of the arm 28 being limited by the engagement of a band 29 at its inner end with stops 30 on the outer end of the arms 18. The inner end of the lazy tongs is connected to a bushing 31 slidable on the rod 22. A coil spring 32 interposed between the intermediate portion of the casting 9 and the bushing around the rod 22 tends to normally force the bushing toward the outer end of the casting and maintain the lazy tongs in collapsed position shown in Figure 2.

The ornamental appearance of the signal is enhanced by castings 33 and 34 secured above and below the intermediate portion of the casting 9 and connected by a sleeve 35 similar in construction to the sleeve 6. A conduit 36 for a flexible device 37 is secured in the lower end of the casting 34 and a conduit 37 for the electric light wire 13 terminates at the intermediate portion of the casting 9. The flexible device 37 for operating the lazy tongs against the action of the spring 32 is connected to the bushing, as indicated at 38, and friction on the flexible device is reduced to a minimum by the provision of a pulley 40 journaled in the casting 9 over which the flexible device or cord runs.

The operation of the device is as follows:—A pull on the cord will pull the bushing 31 rearwardly extending the lazy tongs and projecting the arm 28 to the position illustrated in Figure 2. The arm 28 is preferably painted black while the side plates 20 are painted red and movement of the arm 28 outwardly exposes the side plates 20 as will be readily understood. The telescoping movement of the signal arm 28 to its full outward position will warn the drivers of following cars that the car carrying the signal is about to turn or slow down. When the cord 37 is released the spring 32 will automatically restore the signal arm to its folded or collapsed position, said spring acting upon the bushing to collapse the lazy tongs. As the arm 28 moves back toward its normal position it will be stopped by the bumper 17.

It will of course be evident that numerous types of operating mechanisms might be used with the signal, but I have illustrated in Figures 5 and 6 one very convenient type of pedal controlled mechanism for pulling upon the flexible device.

Referring in detail to these figures of the drawings, 41 represents the floor and 42 the foot board of the car. A sector bar 43 is supported upon legs 44 rising from the floor and bushings 45 mounted in these legs provide rotary mounting for a sleeve 46. A lever 47 passing through a stepped slot 48 in the sector bar is provided at its upper end with a pedal 49 and is pivoted at its intermediate portion, as indicated at 50, to a bracket 51 secured around the sleeve 46. A casting 52 is secured in the forward end of the sleeve 46 and into this casting the conduit 36 for the cord 37 leads. The end of the cord is attached to a slotted block 53 slidable in the sleeve. An extension 54 of the lever 47 extends into the slot in the block and is engageable with an adjusting screw 55 carried by the block. Forward movement of the pedal operates to slide the block 53 rearwardly against the action of a coil spring 56 interposed between the block and the rear end of the sleeve. As the block is pulled rearwardly a pull is exerted on the flexible device to operate the signal and the signal may be held in operative position by moving the lever 47 laterally, as indicated in dotted lines at 47' in Figure 6, where it will be held by the slot 48. The rotary mounting of the sleeve 46 permits this lateral movement of the lever. As the lever is released the spring 56 operates to restore the lever to its normal position, at the time when the spring 32 collapses the lazy tongs.

I have illustrated one of the preferred embodiments of the invention, but it is to be understood that numerous changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In an automobile signal, a standard, a stationary signal arm section fixed to the standard, a movable signal arm section normally enclosing and concealing said stationary arm section, a lazy tongs within the stationary arm section connected with the movable arm section, means for operating said tongs to move the movable section outwardly and expose the stationary section, said tong operating means comprising a rod including bifurcated ends wherein said tongs are pivoted, a bushing slidable on the rod, and means connecting the bushing and tongs to effect extension of the tongs upon sliding of the bushing in one direction.

2. In an automobile signal, a standard, a stationary signal arm section fixed to the standard, a movable signal arm section normally enclosing and concealing said stationary arm section, a lazy tongs within the stationary arm section connected with the stationary arm section, means for operating said tongs to move the movable section outwardly and expose the stationary section, said tong operating means comprising a rod including bifurcated ends wherein said tongs are pivoted, a bushing slidable on the rod, and means connecting the bushing and tongs to effect extension of the tongs upon sliding of the bushing in one direction, said means comprising pivoted links.

3. In an automobile signal, a standard, a stationary signal arm section fixed to the standard, a movable signal arm section normally enclosing and concealing said stationary arm section, a lazy tongs within the stationary arm section connected with the movable arm section, means for operating said tongs to move the movable section outwardly and expose the stationary section, said tong operating means comprising a rod including bifurcated ends wherein said tongs are pivoted, a bushing slidable on the rod, means connecting the bushing and tongs to effect extension of the tongs upon sliding of the bushing in one direction, said means comprising pivoted links, and a spring acting on the bushing to normally collapse the tongs.

4. In an automobile signal, a standard, a stationary signal arm section fixed to the standard, a movable signal arm section normally enclosing and concealing said stationary arm section, a lazy tongs within the stationary arm section connected with the movable arm section, means for operating said tongs to move the movable section outwardly and expose the stationary section, said tong operating means comprising a rod including bifurcated ends wherein said tongs are pivoted, a bushing slidable on the rod, means connecting the bushing and tongs to effect extension of the tongs upon sliding of the bushing in one direction, said means comprising pivoted links, a spring acting on the bushing to normally collapse the tongs, a flexible device fixed to the bushing, and pedal operated means for exerting a pull on the flexible device to slide the bushing against the action of the spring.

ERNEST W. COURTRIGHT.